United States Patent
Hansen et al.

(10) Patent No.: US 7,082,010 B1
(45) Date of Patent: Jul. 25, 2006

(54) METHOD AND APPARATUS FOR REDUCING SEEK ACOUSTICS IN A DISK DRIVE USING FEEDBACK DURING LARGE CURRENT TRANSITIONS

(75) Inventors: Fred Hansen, Boulder, CO (US); Unkyong Hand, Longmont, CO (US); Fernando Zayas, Loveland, CO (US)

(73) Assignee: Maxtor Corporation, Longmont, CO (US)

( * ) Notice: Subject to any disclaimer, the term of this patent is extended or adjusted under 35 U.S.C. 154(b) by 66 days.

(21) Appl. No.: 10/293,232

(22) Filed: Nov. 12, 2002

Related U.S. Application Data

(60) Provisional application No. 60/345,336, filed on Nov. 9, 2001.

(51) Int. Cl.
*G11B 5/596* (2006.01)
(52) U.S. Cl. .................. 360/78.06; 360/78.07
(58) Field of Classification Search ............ 360/78.04, 360/78.06, 78.05, 69, 78.07
See application file for complete search history.

(56) References Cited

U.S. PATENT DOCUMENTS

| | | | |
|---|---|---|---|
| 4,547,822 A | 10/1985 | Brown | 360/78 |
| 4,775,903 A | 10/1988 | Knowles | 360/78 |
| 4,796,112 A | 1/1989 | Mizukami et al. | 360/78.07 |
| 4,937,689 A * | 6/1990 | Seaver et al. | 360/78.07 |
| 4,956,831 A | 9/1990 | Sarraf et al. | 369/32 |
| 4,965,501 A | 10/1990 | Hashimoto | 318/595 |
| 5,005,089 A | 4/1991 | Thanos et al. | 360/77.08 |
| 5,184,339 A | 2/1993 | Tsuchiya | 369/44.28 |
| 5,255,249 A | 10/1993 | Horigome | 369/32 |
| 5,291,110 A | 3/1994 | Andrews, Jr. et al. | 318/560 |
| 5,465,034 A | 11/1995 | Andrews, Jr. et al. | 318/560 |
| 5,465,035 A | 11/1995 | Scaramuzzo, Jr. et al. | 318/561 |
| 5,657,179 A | 8/1997 | McKenzie | 360/78.06 |
| 5,668,680 A | 9/1997 | Tremaine | 360/78.07 |
| 5,677,609 A | 10/1997 | Khan et al. | 318/561 |
| 5,696,647 A | 12/1997 | Phan et al. | 360/78.07 |
| 5,726,825 A | 3/1998 | Phan et al. | 360/78.07 |
| 5,751,513 A | 5/1998 | Phan et al. | 360/78.07 |
| 5,760,992 A | 6/1998 | Phan et al. | 360/78.07 |
| 6,148,240 A | 11/2000 | Wang et al. | 700/63 |
| 6,256,163 B1 | 7/2001 | Schmidt et al. | 360/78.09 |

OTHER PUBLICATIONS

U.S. Appl. No. 09/439,775, filed Nov. 12, 1999, DeRosa.

* cited by examiner

*Primary Examiner*—Andrew L. Sniezek
*Assistant Examiner*—Mitchell Slavitt
(74) *Attorney, Agent, or Firm*—Tejpal S. Hansra

(57) ABSTRACT

A method and apparatus for reducing seek acoustics in a disk drive using feedback during large current transitions is provided. A desired transition profile, which uses feedback, is followed in order to smoothen transitions of a commanded current profile that is supplied to a VCM for moving a head relative to a disk surface during a seek operation. Linear interpolation is used to provide feedback for following the desired transition profile.

51 Claims, 6 Drawing Sheets

METHOD AND APPARATUS FOR REDUCING SEEK ACOUSTICS IN A DISK DRIVE USING FEEDBACK DURING LARGE CURRENT TRANSITIONS

CROSS-REFERENCE TO RELATED APPLICATIONS

Priority is claimed from U.S. Provisional Patent Application Ser. No. 60/345,336 filed Nov. 9, 2001, which is incorporated herein by reference in its entirety.

FIELD OF THE INVENTION

The present invention relates to computer disk drives. More particularly, the present invention relates to reducing seek acoustics in a disk drive.

BACKGROUND OF THE INVENTION

Computer disk drives store information on magnetic disks. Typically, the information is stored on each disk in concentric tracks, divided into sectors. Information is written to and read from a disk by a head (or transducer), which is mounted on an actuator arm capable of moving the head radially over the disk. Accordingly, the movement of the actuator arm allows the head to access different tracks. The disk is rotated by a spindle motor at a high speed, allowing the head to access different sectors on the disk. The head may include separate or integrated read and write elements.

A disk drive 10 is illustrated in FIG. 1. The disk drive comprises a disk 12 that is rotated by a spin motor 14. The spin motor 14 is mounted to a base plate 16.

The disk drive 10 also includes an actuator arm assembly 18 having a head 20 (or transducer) mounted to a flexure arm 22, which is attached to an actuator arm 24 that can rotate about a bearing assembly 26 that is attached to the base plate 16. The actuator arm 24 cooperates with a voice coil motor 28 in order to move the head 20 relative to the disk 12. The spin motor 14, voice coil motor 28 and head 20 are coupled to a number of electronic circuits 30 mounted to a printed circuit board 32. The electronic circuits 30 typically include a read channel chip, a microprocessor-based controller and a random access memory (RAM) device. Instead of a one disk configuration (shown in FIG. 1), the disk drive 10 may include a plurality of disks 12 and, therefore, a plurality of corresponding actuator arm assemblies 18.

FIG. 2 is a diagrammatic representation of a simplified top view of a disk 12 having a surface 42 which has been formatted to be used in conjunction with a sectored servo system (also known as an embedded servo system). As illustrated in FIG. 2, the disk 12 includes a plurality of concentric tracks 44a–44h for storing data on the disk's surface 42. Although FIG. 2 only shows a relatively small number of tracks (i.e., 8) for ease of illustration, it should be appreciated that typically tens of thousands of tracks are included on the surface 42 of a disk 12.

Each track 44a–44h is divided into a plurality of data sectors 46 and a plurality of servo sectors 48. The servo sectors 48 in each track are radially aligned with servo sectors 48 in the other tracks, thereby forming servo wedges 50 which extend radially across the disk 12 (e.g., from the disk's inner diameter 52 to its outer diameter 54).

One of the operations that a disk drive performs is known as a seek operation. During a seek operation, the head 20 is moved from a present track of the disk to a target track of the disk, so that a data transfer can be performed with the target track. In order for a seek operation to be performed, a current is delivered to the VCM 28 of the disk drive, which causes the actuator arm 24 to rotate, thereby moving the head 20 radially relative to the disk surface 42.

It is desirable to perform seek operations as quickly as possible. Accordingly, in conventional long seek operations, for example, a maximum current will be applied to the VCM 28 in a first direction for a period of time to accelerate the head 20 towards a maximum velocity as it moves towards the desired track. Once the head 20 reaches its maximum velocity, no current is applied to the VCM 28 and the head 20 coasts at its maximum velocity for a period of time. Just prior to reaching the target track, in order to decelerate the head 20, a maximum current is applied to the VCM 28 in a direction opposite to the first direction, such that the head 20 is positioned near the target track. Once near the target track, the drive 10 may enter a linear mode to position the head 20 more closely to the target track. A diagrammatic representation of such a bang-coast-bang commanded current profile is illustrated as curve 302 in FIG. 3. (The actual current profile is illustrated as curve 304 and is different from the commanded current profile due to the back electromotive force (BEMF) associated with the actuator arm and VCM. This concept is well-understood to those skilled in the art.)

Application of currents in such a fashion causes abrupt changes in the acceleration and deceleration of the head. This tends to excite vibration modes in the drive, which can cause acoustic noise due to seek operations (also known as seek acoustics). If seek acoustics are not kept within acceptable levels, a disk drive may fail to meet qualification standards, which reduces drive yields and increases the overall manufacturing costs of disk drives.

The locations where large changes occur in the current supplied to the VCM are known as transitions (or seek transitions). As shown in FIG. 3, which illustrates a long seek, transitions occur when changing from an acceleration phase to a coast phase (Region A) and from a coast phase to a deceleration phase (Region B). As shown in FIG. 4, which illustrates a shorter seek than that shown in FIG. 3, the head goes from an acceleration phase to deceleration phase without a coast phase. Accordingly, transitions occur when changing from an acceleration phase to a deceleration phase (Region C). Unless measures are taken to smoothen the transitions, it is likely that vibration modes will be excited and acoustic noise will be generated.

While others have recognized that transitions in the seek current can cause acoustic noise, the solutions that have been offered have not been completely satisfactory. For example, others have used open-loop techniques by slew rate limiting or by fixed transition shapes that vary by seek length. A disadvantage of such open-loop techniques is that the control input cannot be adjusted to ensure convergence of the commanded and actual position once a transition begins. Furthermore, the open-loop techniques are selected by trial-and-error and are not automated.

Accordingly, it would be advantageous to provide a method and apparatus for reducing seek acoustics in a disk drive system by providing smooth, quiet and robust transitions in seek current. It would also be desirable that such a method and apparatus would include a feedback mechanism (i.e., closed-loop system), so as to ensure convergence of the commanded and actual position once the transition has begun. It would also be beneficial if the method and apparatus were automated.

SUMMARY OF THE INVENTION

The present invention is designed to meet the aforementioned, and other, needs. The invention is directed to a method and apparatus for reducing seek acoustics in a disk drive using feedback during seek transitions.

In contrast to prior open-loop systems, the present invention provides a closed-loop technique (i.e., a system with feedback) for following a desired transition profile in order to smoothen transitions of a commanded current profile that is supplied to a VCM for moving a head relative to a disk surface during a seek operation. Linear interpolation is used to provide feedback for following the desired transition profile.

Other embodiments, objects, features and advantages of the invention will be apparent from the following specification taken in conjunction with the following drawings.

DETAILED DESCRIPTION OF THE PREFERRED EMBODIMENT

Figure 1:
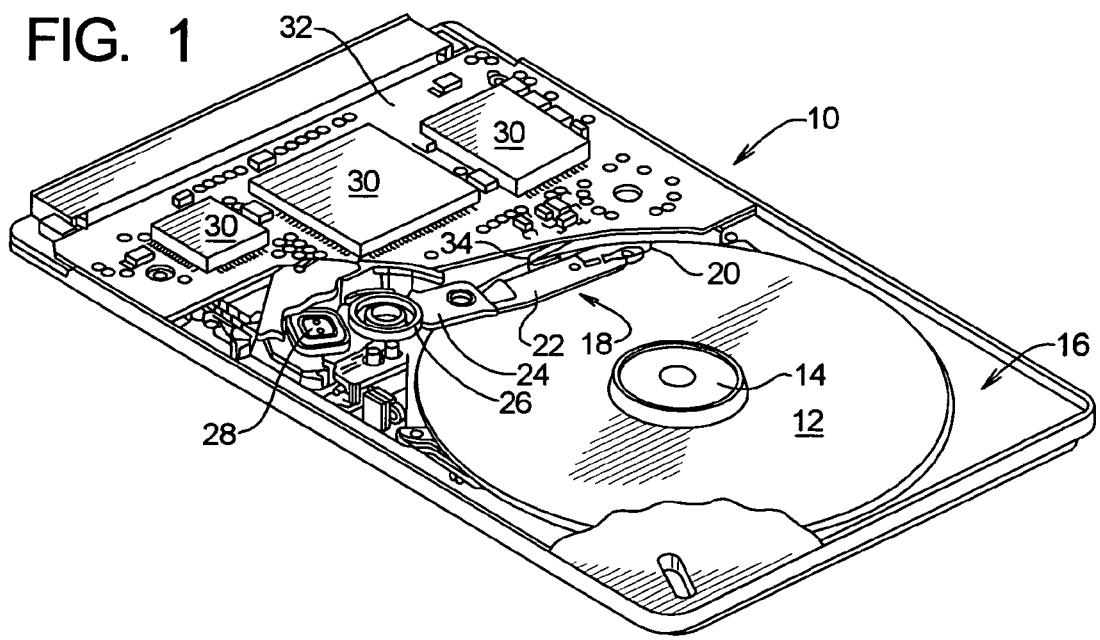
FIG. 1 is a diagrammatic representation of a conventional disk drive.
Figure 2:
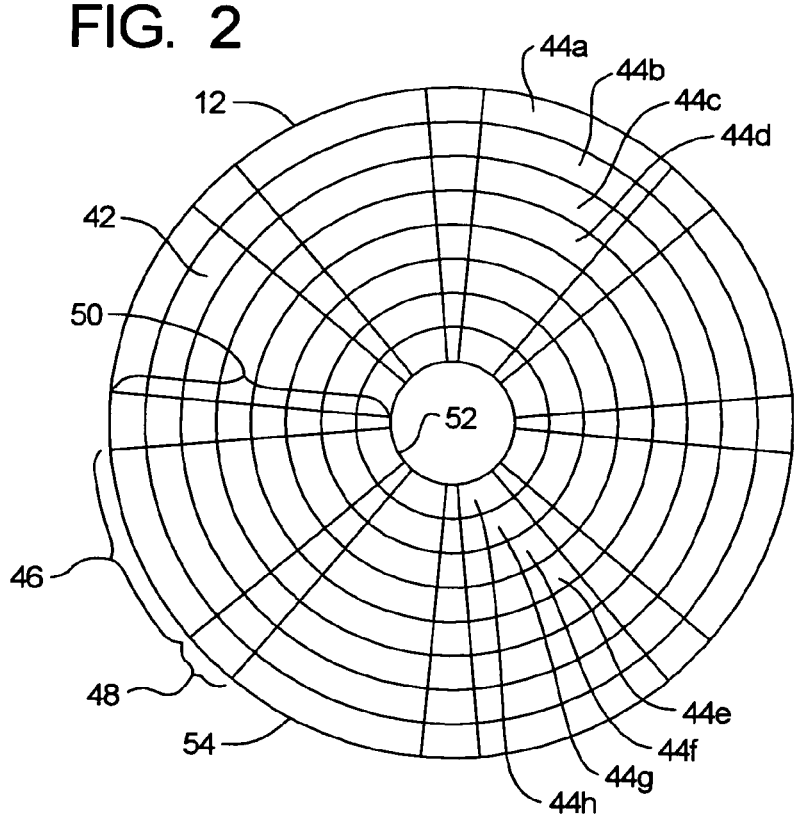
FIG. 2 is a diagrammatic representation illustrating a conventional disk surface that has been formatted to be used in conjunction with a sectored servo system.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The present invention is directed to reducing seek acoustics in a disk drive. This is accomplished by selecting a smooth transition profile and using feedback to ensure that the seek current (i.e., control signal applied to the VCM) approximately follows the selected transition profile. By approximately following the smooth transition profile, fewer mechanical resonances are excited by the control signal applied to the VCM. Accordingly, acoustic noise is reduced.

Figure 5:
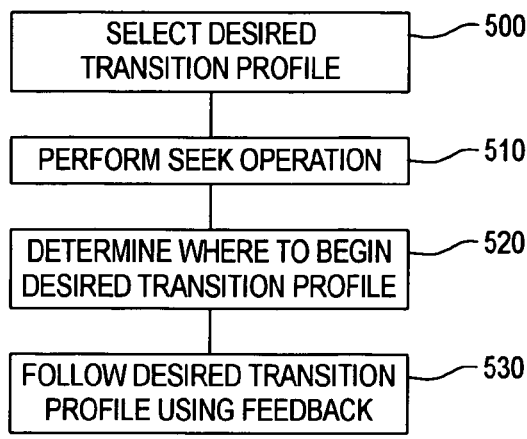
FIG. 5 is a flowchart of one embodiment of the invention.

FIG. 5 is a flowchart which describes one embodiment of the method of the present invention. The description of the invention will generally follow the steps set forth in the flowchart.

Figure 6:
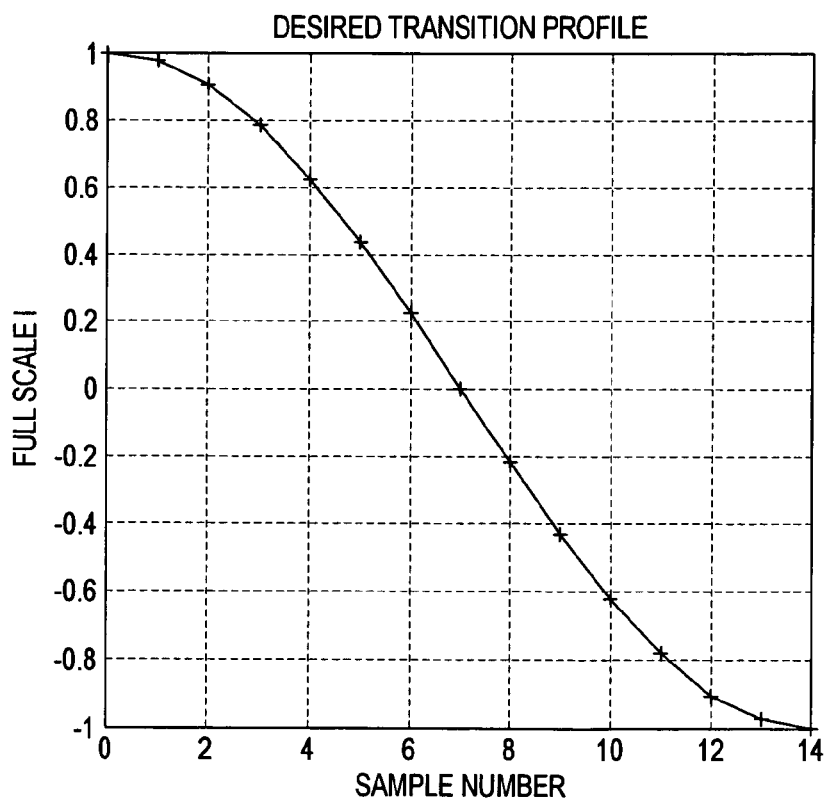
FIG. 6 is a diagrammatic representation of an exemplary desired transition profile.

With reference to FIG. 5, in step 500, a determination is made as to a desired transition profile to follow. The desired transition profile should preferably be smooth and simple to compute. FIG. 6 illustrates a half-period cosine function, which has been selected as an exemplary desired transition profile. It should be understood that other transition profiles may be chosen.

In selecting the desired transition profile, its length must also be selected. Subsequently, the desired transition profile is then pre-computed and stored in a look-up table.

In FIG. 6, the desired transition profile has a length of 15 sample times (i.e., sample numbers 0–14). It should be understood, however, that the length may vary based on system performance requirements. For example, if power consumption is a concern (e.g., in mobile products), the length of the desired transition profile may be longer. In contrast, if seek performance is to be increased, the length of the desired transition profile may be shorter.

Referring again to FIG. 5, in step 510, a seek operation is performed. That is, current is delivered to the VCM to move the head from a present track to a target track. The amount of current supplied to the VCM is dependent upon the number of tracks-to-go from the present position of the head to the target track (also known as the seek length). For very long seeks, for example, the current delivered to the VCM may take a form similar to the current profile shown in FIG. 3. Similarly, for seeks shorter than that shown in FIG. 3, for example, the current delivered to the VCM may take a form similar to the profile shown in FIG. 4. The current profiles are generally pre-calculated and stored in memory (e.g., in a look-up table).

Figure 3:
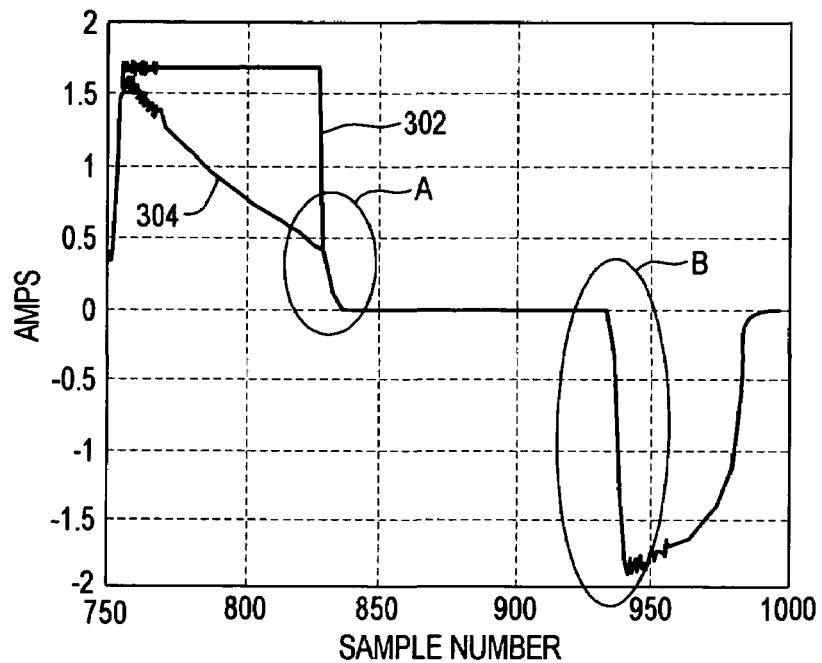
FIG. 3 is a diagrammatic representation of a conventional bang-coast-bang current profile, which is used when performing a long seek and which illustrates a commanded current profile and an actual current profile.
Figure 4:
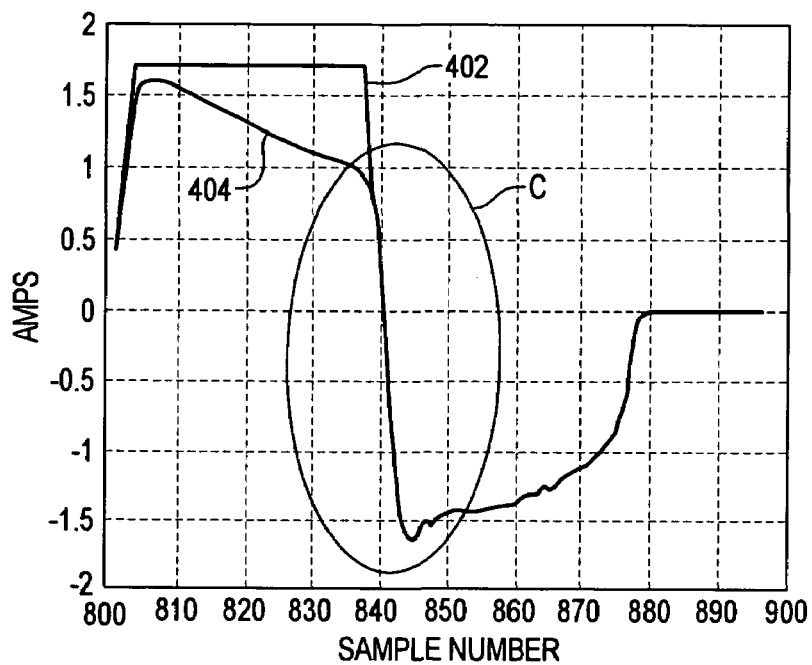
FIG. 4 is a diagrammatic representation of a conventional bang—bang current profile for a seek shorter than that shown in FIG. 3, wherein FIG. 4 also illustrates a commanded current profile and an actual current profile.

Instead of following the current profiles that have been pre-calculated and stored in memory, in the present invention, the desired transition profile is followed at the transitions of the current profile (i.e., at Regions A and B in FIG. 3 and Region C in FIG. 4). Because the current supplied to the VCM is dependent upon the seek length, the starting point of each transition of the current profile will also be dependent upon the seek length. Accordingly, as set forth in step 520, a determination must be made as to where the transition begins, so that the desired transition profile may be followed instead of following the transition of the stored current profile.

If the desired transition profile is followed too soon, deceleration of the head may occur too slowly and performance will be decreased. Furthermore, a sharp transition may still occur, which might cause acoustic noise. If the desired transition profile is followed to late, an overshoot situation may arise, which would also decrease performance. Accordingly, it is important that the desired transition profile be followed at an appropriate time.

Figure 7:
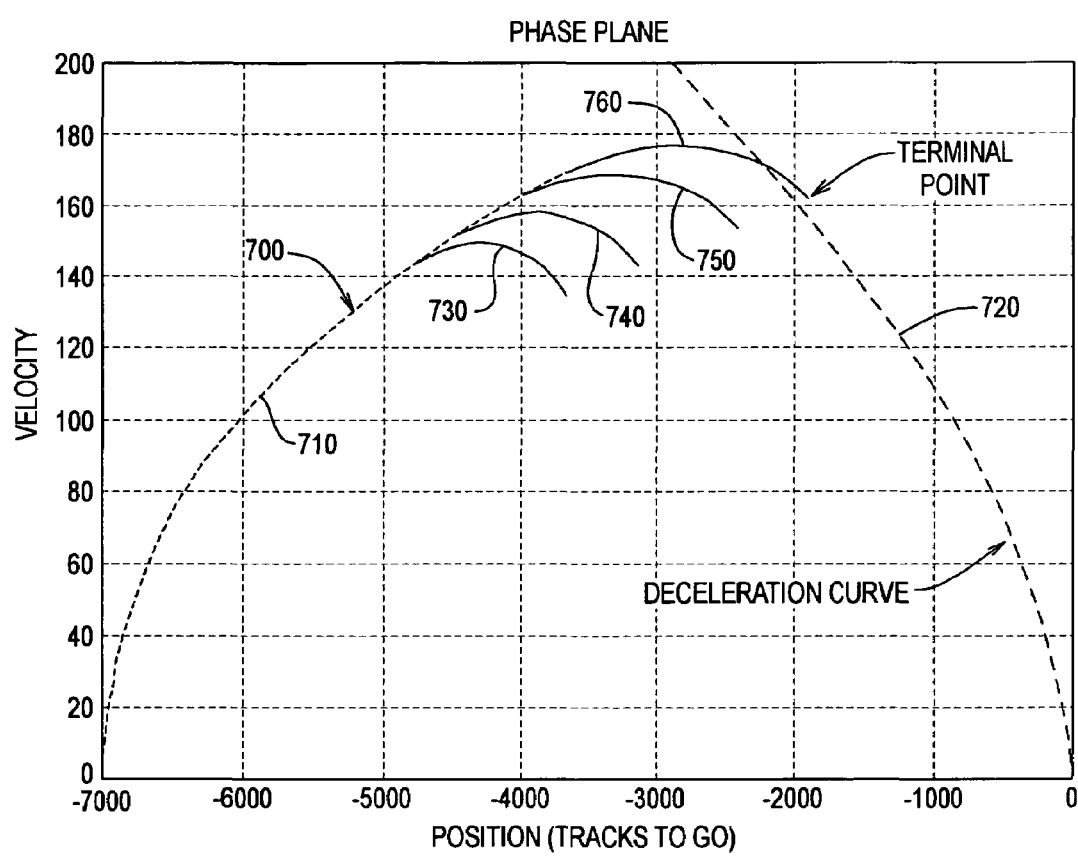
FIG. 7 is a diagrammatic representation of a method for determining where to begin following a desired transition profile.

FIG. 7 illustrates a technique which may be used to determine when to begin following the desired transition profile. In FIG. 7, velocity of the head is represented along the y-axis and position of the head (i.e., number of tracks-to-go to the target track) is represented along the x-axis. Curve 700 illustrates the velocity of the head as a seek operation is being performed. Since the slope of the curve 700 represents the acceleration or deceleration of the head, curve 700 can be thought of as being divided into an acceleration portion 710 and a deceleration portion 720.

If the present invention were not used, there would be an abrupt change between the acceleration portion 710 and the deceleration portion 720 of the curve 700, which may cause acoustic noise. By following a desired transition profile in accordance with the present invention, a smooth transition from the acceleration portion 710 to the deceleration portion 720 of the curve 700 is provided, so that acoustic noise is reduced. However, as alluded to above, a determination must be made as to when to begin following the desired transition profile to ensure a smooth transition from the acceleration portion 710 of the curve 700 to the deceleration portion 720 of the curve 700.

Curves 730, 740, 750 and 760 represent projections of the desired transition profile at four different starting points (i.e., 4750, 4500, 4000 and 3500 tracks-to-go) along acceleration portion 710 of curve 700. The desired transition profile should begin to be followed at a point $(v_0, x_0)$ which causes the desired transition profile to end at a terminal point $(v_N, x_N)$ (where N is the number of sample times of the desired transition profile, which is 15 in the example of FIG. 6) near the deceleration portion 720 of curve 700. Specifically, a determination is made as to a starting point along the acceleration portion 710 of the curve 700 where the projection of the desired transition profile will cross the deceleration portion 720 of the curve 700. In FIG. 7, curve 760 crosses the deceleration portion 720 of the curve 700 at a starting point of about 3500 tracks-to-go. Accordingly, this should be the starting point of the transition. Further explanation of how to determine the starting point of the transition profile will be described below.

Referring again to FIG. 5, once the starting point of the desired transition profile has been determined, the desired transition profile is followed using feedback (step 530). Specifically, the desired transition profile is followed using linear interpolation between terminal points which straddle the deceleration portion 720 of curve 700, which will be described in further detail below in connection with FIGS. 8 and 9.

In order to predict the terminal point $(v_N, x_N)$ given a starting point $(v_0, x_0)$ for the purpose of determining when to begin the transition profile, reference will be made to a number of equations. The trajectories of curve 700 and the desired transition profile are pre-computed from the applicable state equations. As is known to those skilled in the art, the unforced response for a discrete time system is:

$$x_{k+1} = A x_k$$

$$x_N = A^N x_0$$

where k is the sample time, N is the maximum k, x is a state vector, $x_0$ is the value of x at sample 0 (or time 0), and A is a system matrix which describes the VCM dynamics.

Given an input, $u_k$, the forced response is:

$$x_{k+1} = A x_k + B u_k$$

$$x_N = A^N x_0 + \sum_{k=0}^{N-1} A^{N-1-k} B u_k$$

where u is the conventional notation for control input and B is an input matrix that describes how control input is added to the system.

Since the VCM can be modeled as a double integrator in discrete time with sample time T, the system matrix A and the input matrix B are:

$$A = \begin{bmatrix} 1 & T \\ 0 & 1 \end{bmatrix}$$

and $$B = \gamma \begin{bmatrix} \frac{1}{2} \\ 1 \end{bmatrix}$$

where the constant $$\gamma = \frac{K_r}{J}$$

for the actuator (or voice coil motor), $K_\tau$ is the torque constant of the VCM and J is the inertia of the VCM.

With sample rate T=1, then we know that:

$$A^N = \begin{bmatrix} 1 & N \\ 0 & 1 \end{bmatrix}.$$

For the shaped input (or desired transition profile), the control input $u_k$ can be broken into two components:

$$u_k = s + g t_k,$$

where s is a constant that represents the amount of shift required to account for the BEMF (back electromotive force) generated in the voice coil due to the movement of the actuator arm, $t_k$ is the desired transition profile (e.g., a half-period unit cosine function, as shown in FIG. 5) and g is a scaling factor required to fit the desired transition profile $t_k$ to the actual commanded input in full scale current.

Substituting for $u_k$, the total response becomes:

$$x_N = A^N x_0 + \sum_{k=0}^{N-1} A^{N-1-k} B(s + g t_k).$$

Then substitute for A and B in the forced response, $$\sum_{k=0}^{N-1} A^{N-1-k} B(s + g t_k) = \sum_{k=0}^{N-1} \gamma \begin{bmatrix} 1 & N-1-k \\ 0 & 1 \end{bmatrix} \begin{bmatrix} \frac{1}{2} \\ 1 \end{bmatrix} [s + g t_k] =$$

$$\gamma s \sum_{k=0}^{N-1} \begin{bmatrix} n-1-k+\frac{1}{2} \\ 1 \end{bmatrix} + \gamma g \sum_{k=0}^{N-1} \begin{bmatrix} N-1-k+\frac{1}{2} \\ 1 \end{bmatrix} t_k.$$

Pre-compute the terms:

$$a_j = \sum_{k=j}^{N-1} \begin{bmatrix} N-1-k+\frac{1}{2} \\ 1 \end{bmatrix}$$

and $$b_j = \sum_{k=j}^{N-1} \begin{bmatrix} N-1-k+\frac{1}{2} \\ 1 \end{bmatrix} t_k.$$

$$\sum_{k=j}^{N-1} A^{N-1-k} B(s+gt_k) = \gamma(sa_j + gb_j) \quad \text{(Equation 1)}$$

N is pre-selected and remains constant, which in the case of FIG. 6 is 15. The index j indicates the point at which the computation of the sequence on a given transition shape begins.

Given the average shift (s) required to account for the BEMF and the shaped responses ($gt_k$) computed as shown above, as the control system accelerates, a determination is made as to whether the desired transition profile will cross the deceleration portion of the curve using Equation 1. That is, given a particular starting point on the curve 750, a determination is made as to whether a terminal point N samples ahead will cross the deceleration curve. Once the transition has begun, the terminal point will always lie on the side of the deceleration curve that has been crossed (e.g., the right side of the deceleration curve 720 in FIGS. 7 and 8) until the transition is complete.

Figure 8:
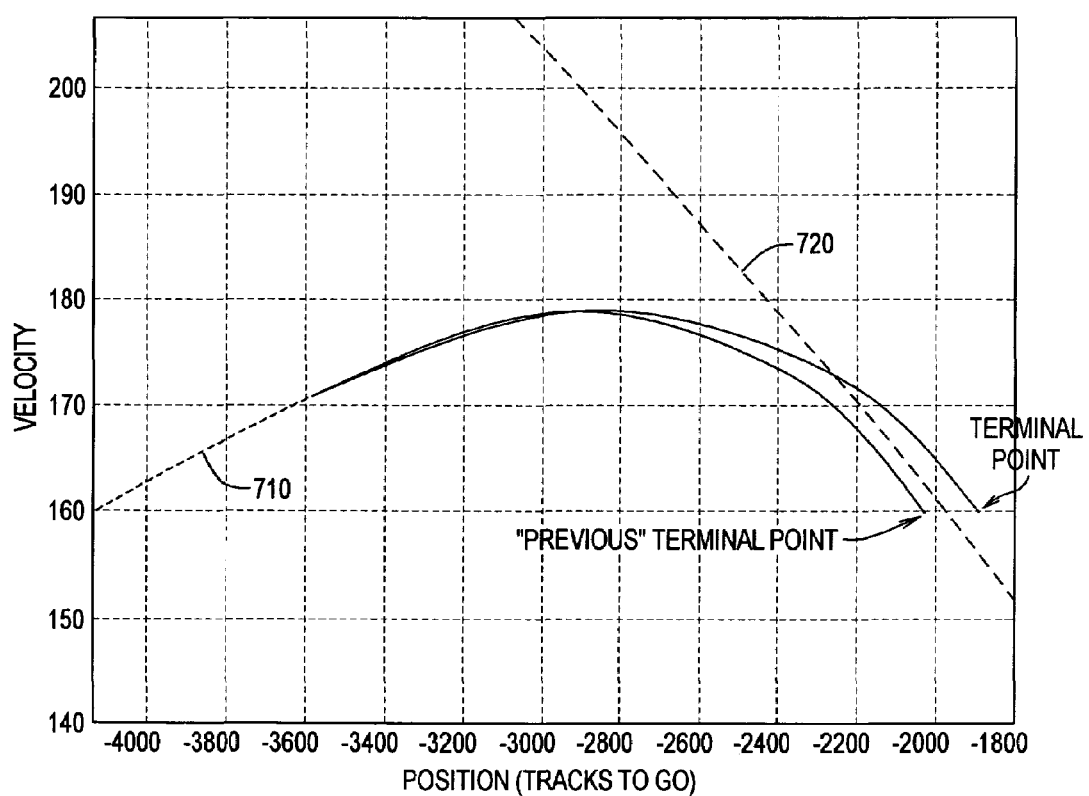
FIG. 8 is a diagrammatic representation of two terminal points (associated with curve 760 of FIG. 7, for example) which straddle a deceleration portion of a current profile and which are used to provide feedback, so that the desired transition profile is followed; and, FIG. 9 is a diagrammatic representation of a method for providing feedback using linear interpolation, so that the desired transition profile is followed.

In determining where the deceleration curve has been crossed, a prediction is made ahead of the beginning of the transition, which occurs at j=0. Referring to FIG. 8 and Equation 1, then the final N-j points are used at each successive sample period to determine the "previous terminal point" (on the left side of the deceleration curve 720 in FIG. 8). That is, given N=15, when the first sequence is computed j=0. The next N-j points are computed to determine the trajectory or transition shape. So, as j increments, it represents a later starting point on a given transition shape.

$x_{N,j}$ represents a point on the desired transition profile, with a given number of samples N and a starting point j. In determining whether to follow the desired transition profile, the points $x_{N,0}$ and $x_{N,1}$ are considered as the last two terminal points. The index j does not begin incrementing until the transition begins, or when the first terminal point crosses the deceleration curve. The algorithm progresses along the shaped transition curve using the last two terminal points with adjacent j's, represented by $x_{N,j}$ and $x_{N,j+1}$. FIG. 8 shows two transition shapes, $x_{N,j}$ and $x_{N,j+1}$, for consecutive j's.

Given the above, the previous terminal point and the interpolation can be described using the a's and b's. Thus, the possible terminal points become:

$$x_{N,j} = A^{N-j} x_0 + \gamma(sa_j + gb_j).$$

The previous terminal point is also looked up, and shifted back to the starting point of the desired transition profile, so that the current and previous terminal points straddle the deceleration curve (see FIG. 8). Then, based upon where the deceleration curve intersects the line between the last two terminal points, a linear interpolation is done on the desired transition profile to determine how much current to command.

After the transition has begun, this process is repeated for the pair of points that straddle the deceleration curve until the transition is complete and the deceleration curve may be followed.

Figure 9:
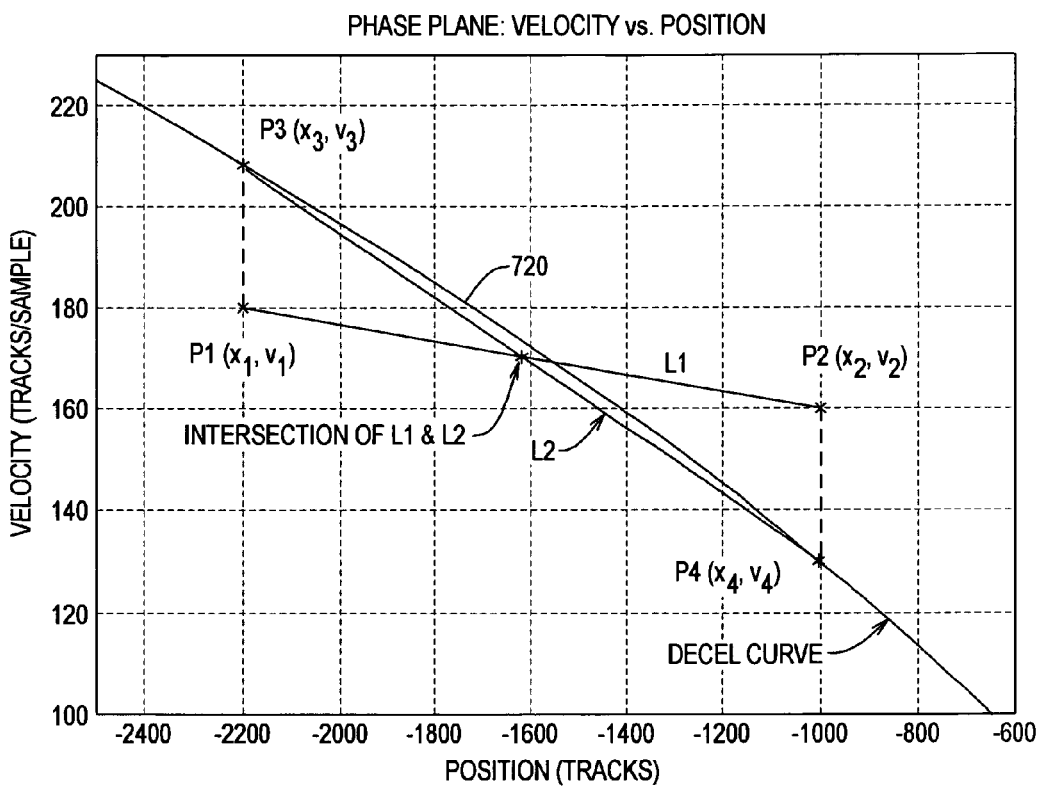

Once a determination has been made as to the location of where to start the transition to the desired transition profile, a linear interpolation is performed to determine the control input (step 530). Reference is made to FIG. 9, which shows how the linear interpolation is performed.

In FIG. 9, P1 and P2 represent adjacent terminal points which straddle the deceleration portion 720 of curve 700 of FIG. 7. P1 and P2 are projected vertically onto the deceleration curve, which define corresponding points P3 and P4 on the deceleration curve. P1 and P2 define a first line segment L1, while P3 and P4 define a second line segment L2.

Next, the intersection between lines L1 and L2 is determined. Since, L1=P1–P2 and L2=P3–P4, the intersection can be found in terms of a fraction of the distance between P1 and P2. This fraction is used to linearly interpolate between the control needed to reach P1 and P2, and the control is applied for the current sample. Since the deceleration curve is not a straight line, then the intersection is an approximation.

More specifically, since $x_1 = x_3$ and $x_2 = x_4$, then:

$$L1: \quad (x-x_1)\frac{(v_2-v_1)}{(x_2-x_1)} = (v-v_1)$$

$$L2: \quad (x-x_1)\frac{(v_4-v_3)}{(x_2-x_1)} = (v-v_3)$$

Letting L1=L2 to find the intersection of the two line segments, then the fraction of the distance between P1 and P2 in terms of position is:

$$\frac{(x-x_1)}{(x_2-x_1)} = \frac{(v_3-v_1)}{(v_2-v_1)-(v_4-v_3)}$$

This fractional amount is applied to adjust the control input of the desired transition profile of FIG. 6.

Advantageously, the present invention may be implemented in firmware or software. Accordingly, no further materials costs are added by the present invention.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
   providing a disk surface;
   providing a head which is moveable relative to the disk surface by a voice-coil motor;

generating a control signal that is delivered to the voice-coil motor to perform a seek operation, wherein the control signal includes a current transition;
following a desired transition profile, instead of the current transition, using feedback; and,
determining where to begin the desired transition profile, wherein the step of determining is performed during the seek operation.

2. The method of claim 1, further including the step of selecting the desired transition profile.

3. The method of claim 1, wherein the desired transition profile is a half-period cosine curve.

4. The method of claim 1, wherein linear interpolation is used to provide the feedback for following the desired transition profile.

5. The method of claim 1, wherein the desired transition profile is pre-computed.

6. The method of claim 5, wherein the pre-computed desired transition profile is stored in a look-up table.

7. The method of claim 1, wherein the determination as to where to begin the desired transition profile is made using a plurality of projections of the desired transition profile.

8. A disk drive comprising:
a disk surface having a plurality of tracks defined thereon;
a head associated with the disk surface; and,
a voice-coil motor for moving the head towards a target track in response to a control signal associated with a seek operation, said control signal including a current transition that follows a desired transition profile using feedback during the seek operation,
wherein a determination is made as to where to begin the desired transition profile and wherein such determination is made during the seek operation.

9. The disk drive of claim 8, wherein the desired transition profile is a half-period cosine curve.

10. The disk drive of claim 8, wherein linear interpolation is used to provide the feedback for following the desired transition profile.

11. The method of claim 8, wherein the desired transition profile is pre-computed.

12. The method of claim 11, wherein the pre-computed desired transition profile is stored in a look-up table.

13. The apparatus of claim 8, wherein the determination as to where to begin the desired transition profile is made using a plurality of projections of the desired transition profile.

14. A method comprising the steps of:
providing a disk surface;
providing a head which is moveable relative to the disk surface by a voice-coil motor in response to a commanded current profile for performing a seek operation;
moving the head relative to the disk surface in response to a desired transition profile using feedback; and,
determining where to begin the desired transition profile, wherein the step of determining is performed during the seek operation.

15. The method of claim 14, further including the step of moving the head relative to the disk surface in response to the commanded current profile once the desired transition profile has been completed.

16. The method of claim 14, further including the step of selecting the desired transition profile.

17. The method of claim 14, wherein the desired transition profile is a half-period cosine curve.

18. The method of claim 14, wherein linear interpolation is used to provide the feedback for following the desired transition profile.

19. The method of claim 14, wherein the desired transition profile is pre-computed and stored in a look-up table.

20. The method of claim 14, wherein the determination as to where to begin the desired transition profile is made using a plurality of projections of the desired transition profile.

21. A method comprising the steps of:
providing a disk surface;
providing a head which is moveable relative to the disk surface by a voice-coil motor;
generating a control signal that is delivered to the voice-coil motor to perform a seek operation, wherein the control signal includes a current transition; and,
following a desired transition profile, instead of the current transition, using feedback, wherein the desired transition profile is a half-period cosine curve.

22. The method of claim 21, wherein linear interpolation is used to provide the feedback for following the desired transition profile.

23. The method of claim 22, wherein the desired transition profile is stored in a look-up table.

24. The method of claim 21, wherein the desired transition profile is stored in a look-up table.

25. A method comprising the steps of:
providing a disk surface;
providing a head which is moveable relative to the disk surface by a voice-coil motor;
generating a control signal that is delivered to the voice-coil motor to perform a seek operation, wherein the control signal includes a current transition; and,
following a desired transition profile, instead of the current transition, using feedback, wherein linear interpolation is used to provide the feedback for following the desired transition profile.

26. The method of claim 25, wherein the desired transition profile is stored in a look-up table.

27. A method comprising the steps of:
providing a disk surface;
providing a head which is moveable relative to the disk surface by a voice-coil motor;
generating a control signal that is delivered to the voice-coil motor to perform a seek operation, wherein the control signal includes a current transition; and,
following a desired transition profile, instead of the current transition, using feedback, wherein the desired transition profile is stored in a look-up table.

28. A disk drive comprising:
a disk surface having a plurality of tracks defined thereon;
a head associated with the disk surface; and,
a voice-coil motor for moving the head towards a target track in response to a control signal associated with a seek operation, said control signal including a current transition that follows a desired transition profile using feedback during the seek operation, wherein the desired transition profile is a half-period cosine curve.

29. The disk drive of claim 28, wherein linear interpolation is used to provide the feedback for following the desired transition profile.

30. The method of claim 29, wherein the desired transition profile is stored in a look-up table.

31. The method of claim 28, wherein the desired transition profile is stored in a look-up table.

32. A disk drive comprising:
a disk surface having a plurality of tracks defined thereon;
a head associated with the disk surface; and,
a voice-coil motor for moving the head towards a target track in response to a control signal associated with a seek operation, said control signal including a current transition that follows a desired transition profile using feedback during the seek operation, wherein linear interpolation is used to provide the feedback for following the desired transition profile.

33. The method of claim 32, wherein the desired transition profile is stored in a look-up table.

34. A disk drive comprising:
a disk surface having a plurality of tracks defined thereon;
a head associated with the disk surface; and,
a voice-coil motor for moving the head towards a target track in response to a control signal associated with a seek operation, said control signal including a current transition that follows a desired transition profile using feedback during the seek operation, wherein the desired transition profile is stored in a look-up table.

35. A method comprising the steps of:
providing a disk surface;
providing a head which is moveable relative to the disk surface by a voice-coil motor in response to a commanded current profile for performing a seek operation; and,
moving the head relative to the disk surface in response to a desired transition profile using feedback, wherein the desired transition profile is a half-period cosine curve.

36. The method of claim 35, wherein linear interpolation is used to provide the feedback for following the desired transition profile.

37. The method of claim 36, wherein the desired transition profile is stored in a look-up table.

38. The method of claim 35, wherein the desired transition profile is stored in a look-up table.

39. A method comprising the steps of:
providing a disk surface;
providing a head which is moveable relative to the disk surface by a voice-coil motor in response to a commanded current profile for performing a seek operation; and,
moving the head relative to the disk surface in response to a desired transition profile using feedback, wherein linear interpolation is used to provide the feedback for following the desired transition profile.

40. The method of claim 39, wherein the desired transition profile is stored in a look-up table.

41. A method comprising the steps of:
providing a disk surface;
providing a head which is moveable relative to the disk surface by a voice-coil motor;
generating a control signal that is delivered to the voice-coil motor to perform a seek operation, wherein a desired transition profile is followed, using feedback, during the seek operation; and,
determining where to begin the desired transition profile, wherein the step of determining is performed during the seek operation.

42. The method of claim 41, wherein the desired transition profile is a half-period cosine curve.

43. The method of claim 41, wherein linear interpolation is used to provide the feedback for following the desired transition profile.

44. The method of claim 41, wherein the desired transition profile is stored in a look-up table.

45. A method comprising the steps of:
providing a disk surface;
providing a head which is moveable relative to the disk surface by a voice-coil motor;
generating a control signal that is delivered to the voice-coil motor to perform a seek operation, wherein a desired transition profile is followed, using feedback, during the seek operation,
wherein the desired transition profile is a half-period cosine curve.

46. The method of claim 45, wherein linear interpolation is used to provide the feedback for following the desired transition profile.

47. The method of claim 46, wherein the desired transition profile is stored in a look-up table.

48. The method of claim 45, wherein the desired transition profile is stored in a look-up table.

49. A method comprising the steps of:
providing a disk surface;
providing a head which is moveable relative to the disk surface by a voice-coil motor;
generating a control signal that is delivered to the voice-coil motor to perform a seek operation, wherein a desired transition profile is followed, using feedback, during the seek operation,
wherein linear interpolation is used to provide the feedback for following the desired transition profile.

50. The method of claim 49, wherein the desired transition profile is stored in a look-up table.

51. A method comprising the steps of:
providing a disk surface;
providing a head which is moveable relative to the disk surface by a voice-coil motor;
generating a control signal that is delivered to the voice-coil motor to perform a seek operation, wherein a desired transition profile is followed, using feedback, during the seek operation,
wherein the desired transition profile is stored in a look-up table.

* * * * *